H. HILL.
METHOD OF MAKING EXPANDED METAL.
APPLICATION FILED SEPT. 7, 1909.
980,638.
Patented Jan. 3, 1911.
2 SHEETS—SHEET 1.
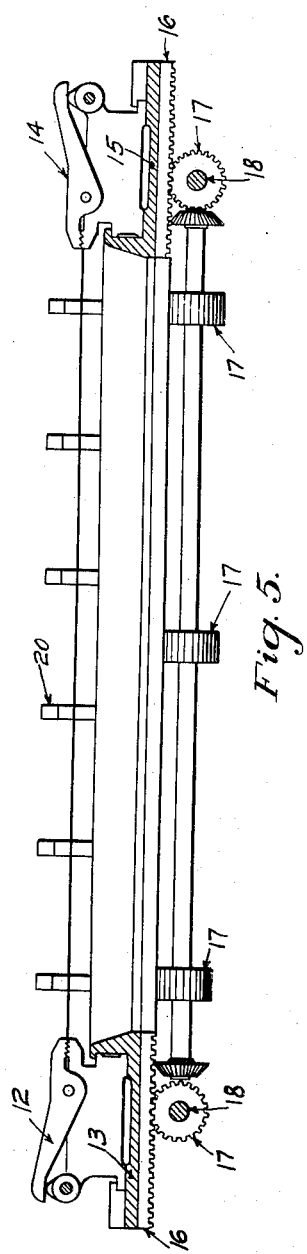
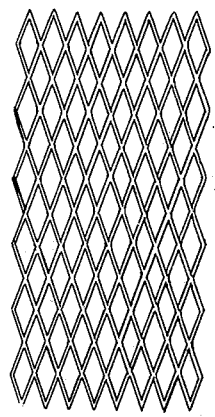
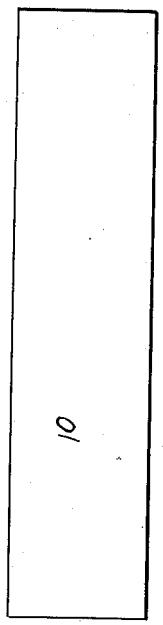
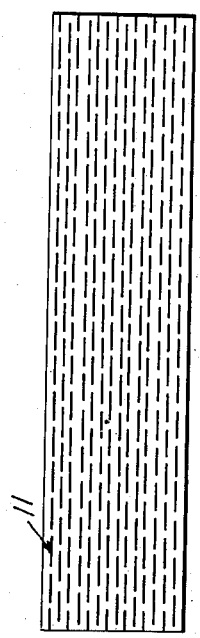
WITNESSES
Stephen Wach.
Jas J Weldon
INVENTOR
Hermann Hill
By Fred'k W. Winter
Attorney H. HILL.
METHOD OF MAKING EXPANDED METAL.
APPLICATION FILED SEPT. 7, 1909.
980,638.
Patented Jan. 3, 1911.
2 SHEETS—SHEET 2.
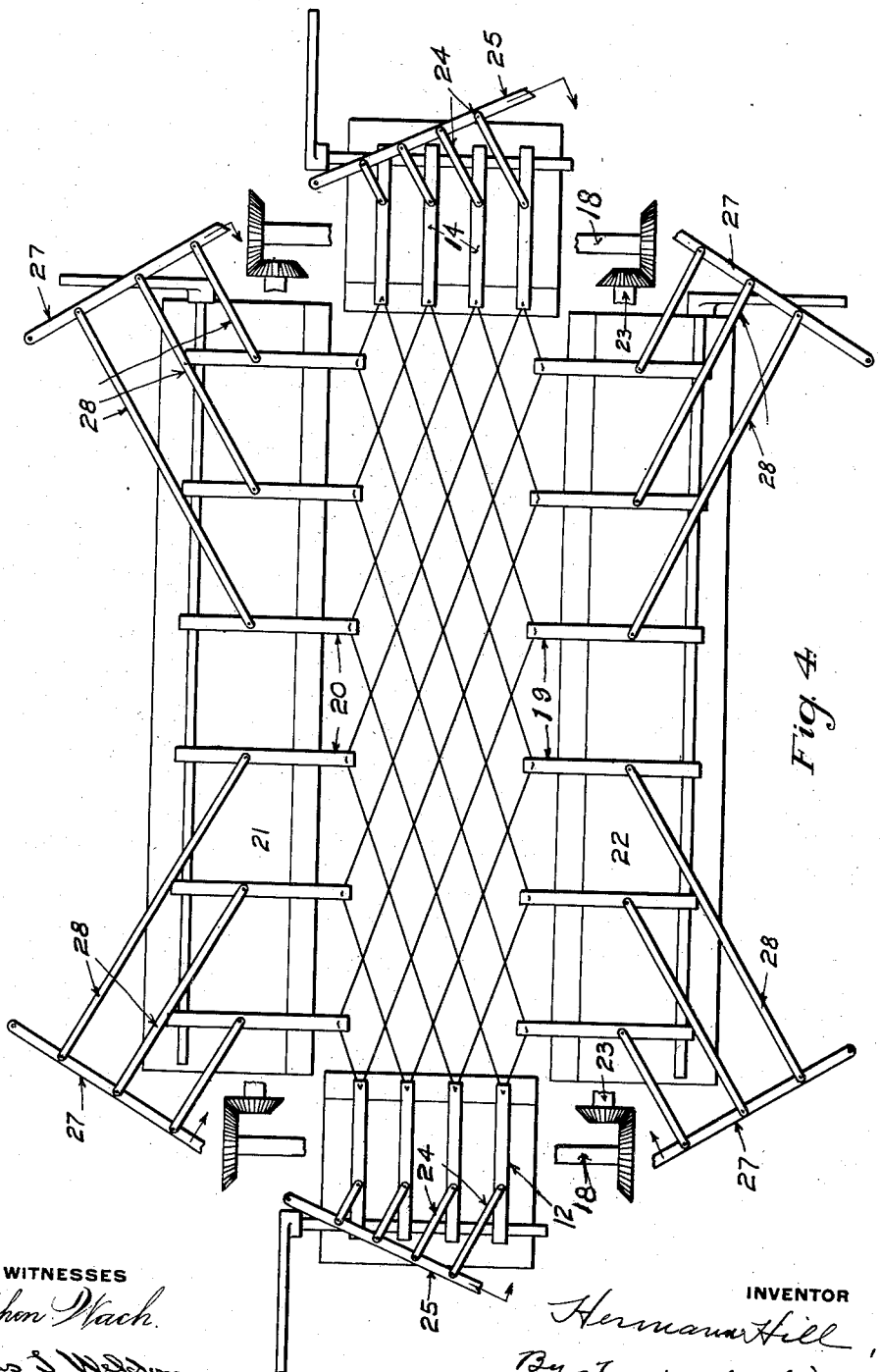
WITNESSES
INVENTOR

UNITED STATES PATENT OFFICE.

HERMANN HILL, OF WARWOOD, WEST VIRGINIA, ASSIGNOR TO STEEL FIREPROOFING COMPANY, OF WHEELING, WEST VIRGINIA, A CORPORATION OF WEST VIRGINIA.

METHOD OF MAKING EXPANDED METAL.

980,638. Specification of Letters Patent. Patented Jan. 3, 1911.

Application filed September 7, 1909. Serial No. 516,506.

*To all whom it may concern:*

Be it known that I, HERMANN HILL, a resident of Warwood, in the county of Ohio and State of West Virginia, have invented a new and useful Improvement in Methods of Making Expanded Metal, of which the following is a specification.

This invention relates to the manufacture of what is known as expanded metal.

In the manufacture of expanded metal two general methods have been employed. In one of these the metal is slit or slashed and the strand or bar so produced is stretched to produce the reticulated or open work or mesh effect. This method is rather severe on the metal and requires a good quality of steel to withstand the stretching operation. According to the other method the sheet or plate is first slit or slashed, and is then expanded sidewise to open the same and form the reticulated or open mesh effect. According to the latter process the bars or strands formed by the slits are not materially stretched, but merely bent, thus being less severe upon the metal than under the other method, but in expanding the sheet or plate it contracts endwise and results in the formation of meshes somewhat hexagonal in shape and not true diamond meshes. For lathing this form is somewhat objectionable as the meshes permit the passage therethrough of an undue amount of plaster.

The present invention has for its object the formation of expanded metal whereby meshes of true diamond shape are formed and which for that reason is preferable for use as lath.

Generally stated, the invention consists in first slitting the sheet and then stretching or expanding the same sidewise to open up the meshes or reticulations, and simultaneously with such sidewise stretching controlling the endwise contraction of the sheet by placing the same under endwise tension so that the sheet cannot contract endwise unduly and resulting in the formation of true diamond meshes, the strands or bars forming the same being by the tension stretched straight.

In the accompanying drawings Figure 1 shows a plan view of the sheet before it is cut or slit; Fig. 2 shows the same sheet after it is cut or slit; Fig. 3 shows a portion of the sheet after it is expanded; Fig. 4 is a diagrammatic plan view illustrating the expanding of the sheet; and Fig. 5 is a diagrammatic sectional elevation of the same.

In carrying out the invention, a sheet or plate such as shown at 10, Fig. 1, is first provided with a series of short slits 11 preferably arranged in parallel lines as shown and with the slits of adjacent lines overlapping or breaking joints, the usual practice in forming what is known as expanded metal. This slitting may be done by any suitable form of apparatus, either reciprocating or rotary cutters, both forms being well known in the art. The slit sheet of metal is then expanded by subjecting the same to sidewise stretching action, and simultaneously therewith the endwise contraction is controlled. This may be performed in any suitable way, even by hand by workmen grasping the side edges of the plate with tongs and stretching it sidewise, other workmen meanwhile by means of tongs exerting an endwise tension on the sheet, or by various forms of apparatus.

Figs. 4 and 5 illustrate generally apparatus for performing the expansion in the manner described. In the apparatus shown the tension to control the endwise contraction of the sheet during the sidewise expansion is effected by two series of tongs or grippers 12 and 14 which grasp the ends of the sheet and which are carried by bars 13 and 15 respectively, which are movable toward and from each other by suitable mechanism, the drawing showing for this purpose rack members 16, on the bars 13 and 15, which are engaged by gears 17 on shafts 18. The sidewise stretching of the sheet to expand the same is shown as effected by a series of tongs or grippers 20 mounted on stationary bar 21 and a series of similar tongs or grippers 19 mounted on a bar 22 which is adapted to be moved laterally away from bar 21 to expand the sheet sidewise. The bar 22 may be moved by any suitable mechanism, the drawing merely indicating a shaft 23 geared to shafts 18, and which shaft 23 will be provided with gears engaging rack members on the bar 22, the mechanism being practically the same as that shown for moving the bars 13 and 15. It is obvious that when shaft 23 is rotated in the proper direction the bar 22 is carried outwardly or away from bar 21 and by this action the sheet is stretched sidewise to open up the slits therein and produce the meshes or reticulations. The gearing connecting shaft 23 with shafts 18 is such that while the bar 22 moves outwardly the bars 13 and 15 move inwardly or toward each other. The driving gears for these shafts are so arranged that during the sidewise stretching of the sheet the bars 13 and 15 are moved toward each other to permit the endwise contraction of the sheet, but at such slow rate of speed that the tongs or grippers exert a retarding effect on the endwise contraction of the sheet, thus holding the sheet under endwise tension while being stretched sidewise and thereby keeping the bars or strands which bound the meshes or reticulations perfectly straight and insuring the formation of true diamond-shaped meshes which are of much less width than length, and produce expanded metal which is especially desirable for lathing as the narrow diamond meshes are not so wasteful of mortar as the irregular or hexagonal meshes produced by the old process.

In the expansion of the sheets in the manner above described it is desirable that the tongs or grippers 19 and 20 which grasp the side edges of the sheet close up or move toward the central transverse line of the apparatus sufficiently to compensate for the endwise contraction or shortening of the sheet. Consequently, these tongs or grippers are movably mounted on the bars 21 and 22, and to insure their movement to corresponding degrees they are connected by links 28 to levers 27, said levers being inclined as shown so as to connect the tongs or grippers thereto at varying distances from the fulcra of said levers, the tongs or grippers near the transverse central line of the meshes being connected comparatively close to the fulcra of the levers and receiving the least movement, while those toward the end of the meshes are united successively to the levers at progressively increasing distances from the lever fulcra so as to receive successively greater degrees of movement, as will be readily apparent. In this way the tongs or grippers are closed up in a manner to insure the spaces between adjacent tongs or grippers being uniform from end to end. Likewise, the tongs or grippers 13 and 14 engaging the ends of the sheet must open up or move away from each other to compensate for the increasing width of the sheet as expanded. To this end said tongs or grippers at each end of the sheet are slidably mounted on the bars 13 and 15 and are positively moved by means of an inclined lever 25 which is connected by links 24 to said tongs or grippers in the same manner as described with reference to the side tongs or grippers. The lever 25 is so arranged that the tongs or grippers next to the stationary edge of the sheet are moved through the least space and those toward the other edge of the sheet are moved progressively through greater spaces. Consequently, the spaces between the tongs or grippers are always uniform, said spaces being increased in proportion to the sidewise expansion of the sheet. The result is that the sheet is expanded in a manner to insure the formation of uniform meshes. The endwise tension to which the sheet is subjected while being expanded is particularly advantageous in that it keeps the strands or bars perfectly straight or stretched and prevents the formation of hexagonal or irregular meshes.

In actual practice a plurality of slit or slashed sheets piled upon each other will be subjected to the action of the expanding apparatus in order to increase the output of the apparatus and for economy in production.

No claim is herein made to the specific form of mechanism used for expanding the sheet and said mechanism is only diagrammatically and generally illustrated, but sufficiently for explaining the method of expanding the sheet. The mechanism will be made the subject of a separate application.

What I claim is:

1. The method of making expanded metal consisting in slitting a sheet, and then stretching the same sidewise and thereby expanding the same widthwise and contracting the same lengthwise and simultaneously therewith maintaining endwise tension thereon and thereby controlling the endwise contraction across the width of the sheet.

2. The method of making expanded metal consisting in taking a sheet provided with slits arranged in parallel rows with the slits of adjacent rows breaking joint or overlapping, and stretching said sheet sidewise to expand the same and simultaneously therewith maintaining endwise tension thereon and thereby controlling the endwise contractions thereof across the width of the sheet.

3. The method of making expanded metal consisting in taking a slit sheet and subjecting the same to sidewise pulling action for its entire length and thereby expanding the same widthwise and contracting the same lengthwise, and simultaneously therewith maintaining endwise tension thereon and thereby controlling the endwise contraction of the sheet across its width.

4. The method of making expanded metal consisting in taking a sheet provided with longitudinal slits arranged in parallel rows, and subjecting the same to lateral stresses to expand the same widthwise and contract the same lengthwise, and simultaneously therewith holding the same under longitudinal tension and thereby controlling the endwise contraction across the width of the sheet.

5. The method of making expanded metal consisting in taking a sheet provided with slits arranged in parallel rows and subjecting the same for its entire length to sidewise pulling action and thereby expanding the same widthwise and contracting the same lengthwise, and simultaneously therewith subjecting the same to endwise tension to control the endwise contraction, and while expanding the same opening up the tension producing devices in proportion to the expansion of the meshes.

6. The method of making expanded metal consisting in taking a sheet provided with slits arranged in parallel rows, subjecting the same to lateral stresses to expand the same widthwise and contract the same lengthwise, and simultaneously therewith maintaining endwise tension thereon and thereby controlling the endwise contraction and closing up the stretching means in proportion to the contraction of the sheet.

7. The method of making expanded metal consisting in taking a sheet provided with slits arranged in parallel rows, subjecting the same to sidewise stretching to expand the same widthwise and contract the same lengthwise, and simultaneously therewith placing the same under endwise tension to control the endwise contraction, and while expanding the same opening up the tension producing devices in proportion to the expansion of the meshes and closing up the stretching means in proportion to the endwise contraction of the sheet.

In testimony whereof, I have hereunto set my hand.

HERMANN HILL.

Witnesses:
R. M. Moore,
Nellie Moore.